US012803901B2

(12) United States Patent
Pitta et al.

(10) Patent No.: US 12,803,901 B2
(45) Date of Patent: Nov. 17, 2026

(54) METHOD FOR OPTIMIZATION OF PATH SELECTION FOR LOAD BALANCING

(71) Applicant: Cisco Technology, Inc., San Jose, CA (US)

(72) Inventors: Srinivas Pitta, Cupertino, CA (US); Murukanandam Kamalam Panchalingam, Dublin, CA (US); Muralidhar Annabatula, Dublin, CA (US); Jason David Notari, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 18/795,581

(22) Filed: Aug. 6, 2024

(65) Prior Publication Data

US 2026/0046243 A1 Feb. 12, 2026

(51) Int. Cl.
*H04L 45/302* (2022.01)
*H04L 47/125* (2022.01)

(52) U.S. Cl.
CPC .......... *H04L 45/302* (2013.01); *H04L 47/125* (2013.01)

(58) Field of Classification Search
CPC ............................ H04L 45/302; H04L 47/125
See application file for complete search history.

(56) References Cited

U.S. PATENT DOCUMENTS

| | | | | |
|---|---|---|---|---|
| 9,923,798 | B1 * | 3/2018 | Bahadur | H04L 45/00 |
| 10,868,731 | B2 * | 12/2020 | Levy-Abegnoli | H04L 41/40 |
| 11,863,458 | B1 | 1/2024 | Matthews et al. | |
| 12,107,834 | B2 * | 10/2024 | Wang | H04L 45/123 |
| 2008/0008178 | A1 | 1/2008 | Tychon et al. | |
| 2014/0269305 | A1 | 9/2014 | Nguyen | |
| 2018/0063743 | A1 * | 3/2018 | Tumuluru | H04L 69/22 |
| 2023/0038307 | A1 * | 2/2023 | Blendin | H04L 47/125 |
| 2023/0117218 | A1 * | 4/2023 | Navon | H04L 12/4641 709/238 |
| 2023/0118718 | A1 * | 4/2023 | Solanki | H04L 12/4633 726/12 |

* cited by examiner

*Primary Examiner* — Frantz B Jean
(74) *Attorney, Agent, or Firm* — Lee & Hayes, P.C.

(57) ABSTRACT

Techniques are provided herein for optimizing path selection for use in load balancing operations. The techniques may comprise receiving a data packet directed to a receiving edge device and selecting a path (e.g., an IPSEC tunnel) to be used to transmit the data packet. The set of paths may be selected based on service level agreement requirements for the data packet. The techniques may further comprise appending, to the data packet, metadata including an indication of the selected path and a current time, and transmitting the data packet to the receiving edge device over the selected path, wherein the receiving edge device is caused to generate information about the selected path based on the metadata. The techniques may further comprise receiving, from the receiving edge device, the information about the selected path, and updating path data stored in local memory based on that information.

19 Claims, 9 Drawing Sheets

METHOD FOR OPTIMIZATION OF PATH SELECTION FOR LOAD BALANCING

TECHNICAL FIELD

The present disclosure relates generally to computer networks, and more particularly, to dynamically adjusting a set of paths (e.g., IPSEC tunnels) used in load-balancing operations based on service level agreement requirements.

BACKGROUND

Software-defined wide area networks (SD-WANs) represent the application of software-defined networking (SDN) principles to WAN connections, such as connections using cellular networks, the Internet, and Multiprotocol Label Switching (MPLS) networks. The power of SD-WAN is the ability to provide consistent service level agreement (SLA) for important application traffic transparently across various underlying paths of varying transport quality and allow for seamless path selection based on path performance characteristics that can match application SLAs.

With the emergence of technologies such as Infrastructure as a Service (IaaS) and Software as a Service (SaaS), the resulting virtualization of services has led to a dramatic shift in the traffic loads of many large enterprises. Indeed, many SaaS services can now be reached in a typical deployment via a number of different network paths. However, path selection can also greatly impact the quality of experience (QoE) associated with a given SaaS application. For instance, delays, losses, or jitter along the routing path can lower the QoE of the SaaS application. However, the use of multiple paths can lead to a strong variation of SLA and QoE.

Today, many path routing decisions are made by distributing network traffic across a set of paths. Equal cost multi-path (ECMP) is an Internet Protocol (IP) routing technique that is used to direct packets along multiple paths. Using ECMP techniques, a device will identify a set of paths having an "equal" cost and will then distribute traffic across that set of paths using a distribution technique (e.g., hashing). Some routing protocols effectively measure the cost of a path by counting the number of traversed hops. However, other metrics may be used to compute the cost of paths, such as bandwidth. Regardless of how the set of "equal cost" paths is determined, there may be significant variance between the individual paths that is not captured.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
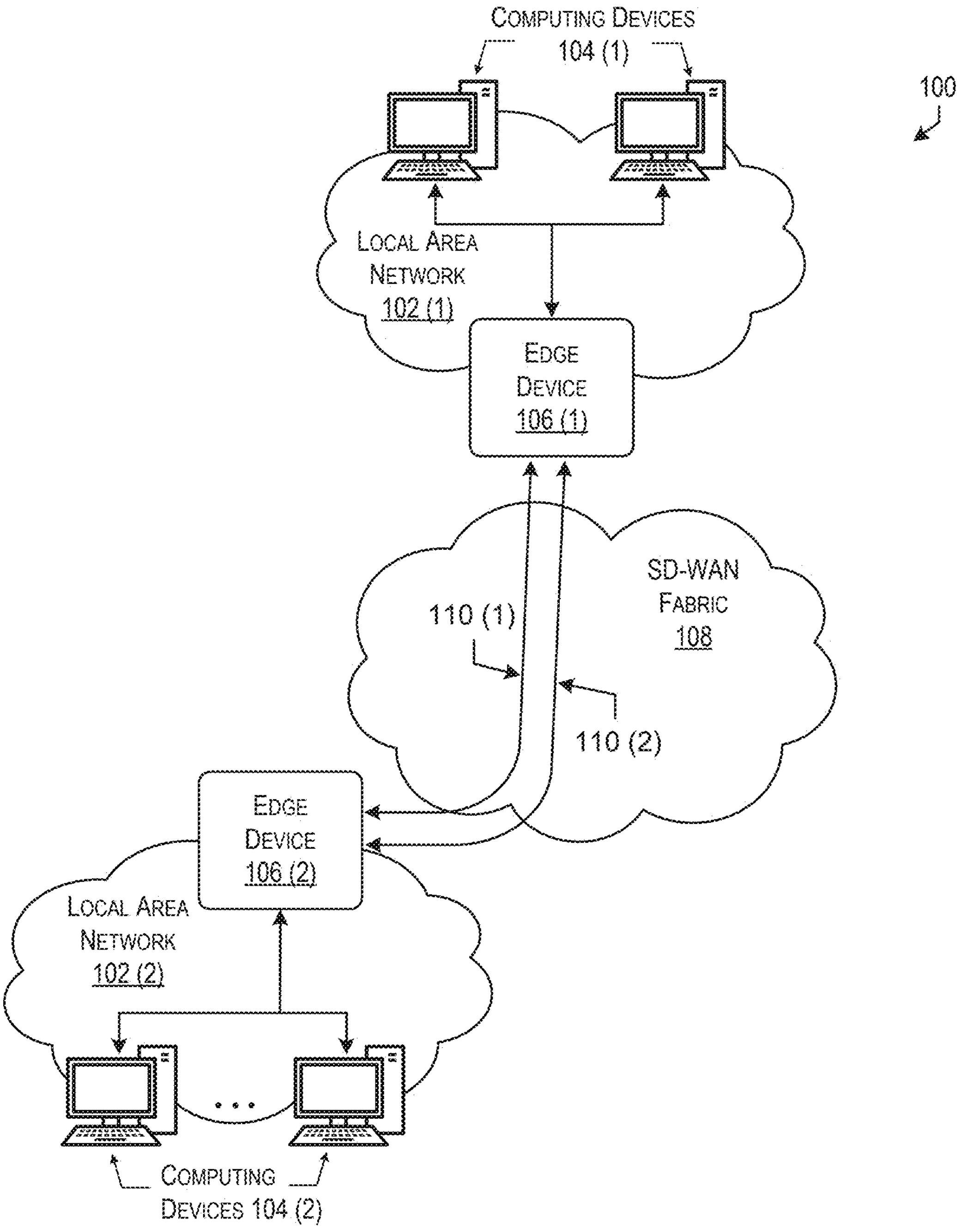
FIG. 1 depicts a block diagram illustrating an example network deployment environment that may be implemented in accordance with at least some embodiments.

A first method according to the techniques described herein may include receiving a data packet directed to a receiving edge device and selecting a path from a set of paths to be used to transmit the data packet. The set of paths may be selected based on service level agreement requirements for the data packet. The techniques may further comprise appending, to the data packet, metadata including an indication of the selected path and a current time, and transmitting the data packet to the receiving edge device over the selected path, wherein the receiving edge device is caused to generate information about the selected path based on the metadata. The techniques may further comprise receiving, from the receiving edge device, the information about the selected path, and updating path data stored in local memory based on that information.

A second method according to the techniques described herein may include receiving a data packet from a source edge device over a path, retrieving at least time data from metadata included in the data packet, determining one or more metric values associated with the path based at least in part on the time data, generating aggregated data based on the one or more metric values, and providing the aggregated data to at least one second edge device.

Additionally, the techniques described herein may be performed by a system and/or device having non-transitory computer-readable media storing computer-executable instructions that, when executed by one or more processors, performs the method described above.

Example Embodiments

This disclosure describes techniques for optimizing path selection for use in load balancing operations. The techniques may be performed by a computing device (e.g., an edge device) acting as a network gateway between two or more networks (e.g., a Local Area Network (LAN) and a SD-WAN fabric) in order to select a path (e.g., an IPSEC tunnel) over which data packets are to be routed. The computing device may be configured to route communications between one or more user devices connected to it via a first network (e.g., the LAN) and one or more applications (e.g., services) hosted by a service provider platform (e.g., a SaaS provider) accessible over a second network (e.g., the SD-WAN fabric). To do this, the edge device may perform a path selection process to determine an appropriate path within the second network over which communications between the user device and the application are to be routed.

When performing the path selection process, the computing device may be configured to distribute packets across a number of different paths using one or more load-balancing techniques. In such techniques, the packets may be distributed across a set of paths that are determined to have an equal (or roughly equal) cost based on various metrics. Metrics may include numerical values assigned to each link that a path traverses such that the cost of the path is the sum of the cost of substantially all links belonging to the path. However, it should be noted that while each of the paths in a set of paths may be determined to have equal costs at a first point in time, that determination may be incorrect or the cost associated with one or more paths may change throughout time. Accordingly, some paths in a set of paths may provide for less optimal transmission of data packets across a network than other paths, even if those paths are considered to have equal cost using traditional routing protocols and techniques.

A service level agreement (SLA) may be made between a subscriber and a service provider to specify a particular level of service to be provided by the service provider to the subscriber. Any violation of conditions of an SLA may lead to inconvenience or worse for a subscriber. An SLA may use metrics that involve network characteristics that may be used to specify an acceptable level of service. Such network characteristics may include, but are not limited to, jitter, packet loss, and delays. Jitter, packet loss, and delays may be different for different equal cost paths. Typically, the selection of an equal cost path does not account for network characteristics. As the jitter, packet loss, and delays associated with each equal cost path may vary greatly, the selection of some equal cost paths based primarily or completely on load balancing requirements may result in a violation of an SLA.

The disclosure provides techniques for assessing paths in a set of (equal cost) paths in order to optimize load balancing across that set of paths. Using such techniques, the system is able to identify a subset of paths that is capable of meeting specified SLA requirements, such that load balancing can be performed over that subset of paths.

In some embodiments, the techniques may involve, each time that a data packet is forwarded to an address, generating metadata (e.g., a cookie) that indicates at least a selected path (e.g., a path over which the data packet is to be sent) and a time at which it is to be sent. The generated metadata is then appended to the data packet before that data packet is encrypted and sent along the selected path to its destination. When the data packet arrives at a second computing device (e.g., a router or other edge device) on its way to the destination, that second computing device decrypts the data packet and retrieves the metadata. The metadata can be aggregated along with metadata obtained from other data packets in order to determine information about the path. In some cases, that information may be provided to one or more machine learning models in order to assess metrics associated with the path.

Information/metrics obtained about paths that is obtained by the second computing device may be provided to one or more devices that perform path selection, which may include the computing device that sent the data packet. In some cases, the information may be included in a response to the data packet and/or a data packet that originates at the second computing device. In other cases, the information may be provided by the second computing device in a separate communication at periodic intervals or when new information is determined. The metrics may then be used to adjust a set of paths used in transmission of data packets.

As noted above, the dynamics of Internet traffic has changed dramatically in recent years, in part due to the proliferation of SaaS applications. Traditionally, network topologies would be computed using traffic matrices thanks to off-line research operational tools allowing for traffic engineering (e.g., using IP, MPLS, etc.). However, with the emergence of SaaS applications, many large networks are now embracing a SaaS model for their critical applications, such as Dropbox™, Office 365™, SAP™, and the like. Thus, it becomes common for the in-house traffic to be sent to an internal data center, whereas the SaaS traffic is sent to various clouds. Such SaaS traffic may itself be sent to the private data center, to a security provider such as ZScaler™ or Umbrella™, a "Col," or even directly to the SaaS provider from a branch office using a VPN.

One of the consequences of the emergence of SaaS traffic is that SaaS traffic tends to use a number of paths that may themselves exhibit various characteristics/key performance indicators (KPIs) in terms of QoE (e.g., loss, latency, delay, jitter, throughput, etc.), thus leading to a strong variation of SLAs and user satisfaction. Typically, this is dealt with by specifying static SLAs on a per application basis using templates. For instance, one SLA template may specify that a tunnel is eligible to carry traffic for a voice application if it exhibits loss<3%, delay<150 ms, etc. Then, for each path, network probes may be used to measure the path characteristics and traffic is routed according to the respective SLAs. Unfortunately, such an approach is reactive in nature, meaning that a re-route occurs after a problem exists. In some cases, SLA measurements can take up to one hour to act on the routing decision in order to avoid traffic oscillations. In the meantime, though, the QoE of the application will be impacted.

Embodiments of the disclosure provide for a number of advantages over conventional systems. For example, when an Internet Protocol (IP) network utilizes an equal cost multi-path (ECMP) capable routing protocol, a load-balancing mechanism is generally used to determine which equal cost path of a plurality of equal cost paths to use in routing packets. Although a particular equal cost path may be appropriate for use from a load-balancing point-of-view, that equal cost path may be subjected to delays and/or jitter as well as packet loss that may render the particular equal cost path to be less desirable than another equal cost path from an IP service level agreement (SLA) standpoint. Accordingly, systems that simply rely on ECMP load balancing may not consistently satisfy SLA requirements for each transaction as individual paths in a set of equal cost paths may not meet those requirements. This can result in data packets being received out of order or dropped. In embodiments of the disclosed system, network traffic for each client can be limited to a subset of links/paths that are individually determined to satisfy the SLA requirements of a sender.

FIG. 1 depicts a block diagram illustrating an example network deployment environment 100 that may be implemented in accordance with at least some embodiments. In FIG. 1, one or more local area network (LAN) 102 (1 and 2) may be accessed by a number of local computing devices 104 (1 or 2) respectively. As depicted, one or more edge device 106 (1 and 2) may be located at the edge of a remote site in order to provide connectivity (e.g., ingress/egress) between a LAN 102 and one or more SD-WAN fabric 108.

An edge device 106 may include any electronic device that provides an ingress/egress point for a network (e.g., LAN 102). The edge device 106 may act as a router for a client user device (e.g., computing device 104). An example of an edge device 106 may include a router, routing switch, integrated access device, multiplexer, or any other suitable device. The edge device 106 may include one or more processors and a memory that stores computer executable instructions for implementing at least a portion of the functionality described herein.

In some embodiments, one or more of the computing devices 104 may represent computing devices operated by individual users. In some embodiments, the computing devices 104 may represent servers operating on a backend system. For example, the computing devices 104 (1) may represent servers operated by one or more Software as a Service (SaaS) providers that host one or more applications to be accessed by the computing devices 104 (1). In this example, the edge device 106 (1) may provide connectivity to the computing devices 104 (2) (i.e., SaaS providers) via a number of paths (e.g., tunnels) 110 (1 and 2) across any number of networks that make up the SD-WAN fabric 108. This allows clients using the LAN 102 of a remote site to access cloud applications (e.g., Office 365™, Dropbox™, etc.) served by computing devices 104 (2).

The SD-WAN fabric 108 may be implemented across a number of computing devices each acting as nodes in the SD-WAN fabric 108. The computing devices making up the SD-WAN fabric 108 may be centralized or clustered in a single location or may be geographically distributed throughout one or more regions. Overseeing the operations of the SD-WAN fabric 108 may be an SDN controller. In general, an SDN controller may comprise one or more devices configured to provide a supervisory service, typically hosted in the cloud, to the SD-WAN fabric 108 and/or one or more SD-WAN service points. For instance, an SDN controller may be responsible for monitoring the operations thereof, promulgating policies (e.g., security policies, etc.), installing or adjusting IPsec routes/tunnels (e.g., paths 110) between LAN 102 (1) and remote destinations such as LAN 102 (2).

As would be appreciated, the SD—WAN fabric 108 may allow for the use of a variety of different paths 110 (1 and 2) between a first edge device 106 (1) and a second edge device 106 (2). For example, an edge device 106 may include, or may be in communication with, a router configured to route communications over the SD-WAN fabric 108 to, for example, one or more applications hosted by a SaaS provider. In this example, the edge device 106 (1) (e.g., router) may utilize two Direct Internet Access (DIA) connections to connect with the edge device 106 (2). More specifically, a first interface of the edge device 106 (1) may establish a first communication path 110 (1) (e.g., a tunnel) with edge device 106 (2) via a first Internet Service Provider (ISP). Likewise, a second interface of the router may establish a second (e.g., backhaul) path 110 (2) with edge device 106 (2) via a second ISP. In some embodiments, the edge device 106 (1) may establish a third path via a private corporate network (e.g., an MPLS network) to a private data center or regional hub which, in turn, provides connectivity to the edge device 106 (2) via another network, such as a third ISP.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN 102 (1) to LAN 102 (2). Other deployments scenarios are also possible, such as using Colo, accessing SaaS provider(s) via Zscaler™ or Umbrella™ services, and the like.

In embodiments, an edge device 106 (1) may, upon receiving a data packet to be transmitted over a SD-WAN fabric 108, identify a set of paths over which the data packet my be transmitted. Initially, the set of paths may include a default set of paths determined to have a lowest (and equal) cost (e.g., minimum number of hops to traverse the SD-WAN fabric 108). The edge device 106 (1) performs a load balancing process to select a path of the set of paths over which the data packet is to be sent. The edge device 106 (1) then generates metadata that includes an indication of the selected path as well as a timestamp representing the current time. The metadata is then appended to the data packet (e.g., in a header). The data packet is then encrypted and transmitted over the selected path.

Upon receiving the data packet over the selected path, the edge device 106 (2) may decrypt at least a portion of the data packet that includes the metadata and retrieve the indication of the selected path and the timestamp. Additionally, the edge device 106 (2) may determine a time at which the data packet was received. The edge device 106 (2) may determine a total amount of transit time for the data packet as a difference between the time at which the data packet was received and the time indicated via the timestamp retrieved from the data packet. The transit time may be used to determine one or more metric (e.g., KPI) values in relation to the selected path. These metric values may be aggregated along with metric values obtained from other data packets to generate aggregated path values. This may be repeated by the edge device 106 (2) to generate aggregated metric data for each of the paths in the set of paths.

Once the edge device 106 (2) has generated aggregated metric data for the various paths in the set of paths, that aggregated metric data may be provided to one or more other edge devices, such as the edge device 106 (1). During load balancing, the edge device may use the aggregated metric data to determine a subset of the paths in the initial set of paths that are capable of meeting SLA requirements for a client. The load balancing process may then be limited to the subset of the set of paths. Hence, the techniques introduced herein improve the application experience for a user by providing optimal path selection and limiting load balancing to those paths determined to be optimal in order to ensure an acceptable level of service.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
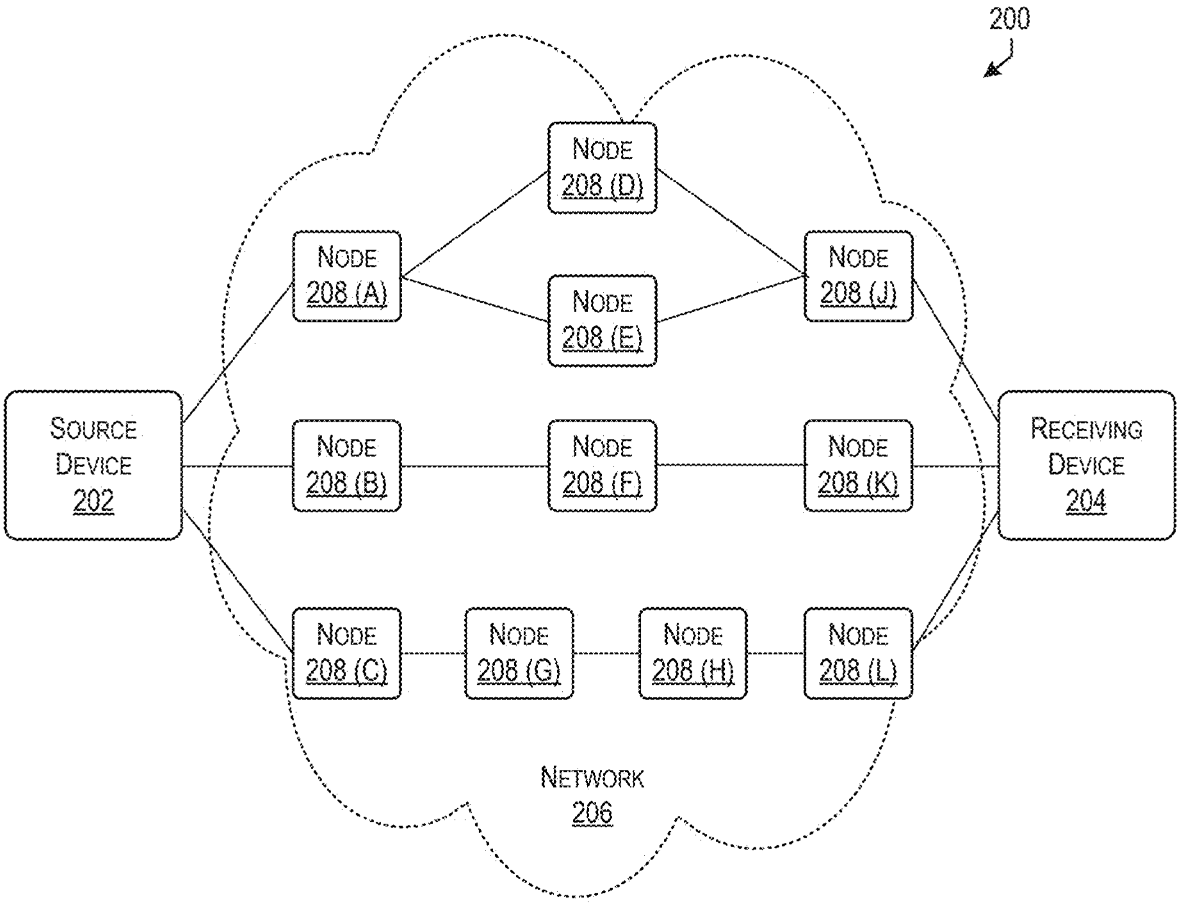
FIG. 2 depicts a block diagram illustrating an example of a network architecture that may be implemented to perform optimized path selection for load balancing in accordance with at least some embodiments.

FIG. 2 depicts a block diagram illustrating an example of a network architecture 200 that may be implemented to perform optimized path selection for load balancing in accordance with at least some embodiments. As depicted in FIG. 2, a source device 202 may be in communication with a receiving device 204 via a network 206. Particularly, the source device 202 may be capable of communicating with the receiving device 204 across multiple paths formed by interconnections between various nodes 208 (A-L) of the network 206.

In some embodiments, paths may constitute IPSEC tunnels defined between two edge devices by a SDN controller or similar entity. In some embodiments, one or more paths may be identified between the source device 202 and the receiving device 204. In some embodiments, the multiple paths are identified using one or more probes (e.g., TCP probes).

A number of paths may be discovered as being available to convey network traffic between the source device 202 and the receiving device 204. For example, four different paths are depicted in the network 206 between the source device 202 and the receiving device 204. Those paths traverse nodes 208 (A-D-J), nodes 208 (A-E-J), nodes 208 (B-F-K), nodes 208 (C-G-H-L). Of those paths, three of them are made up of three hops (A-D-J), (A-E-J), and (B-F-K)) while the fourth is made up of four hops (C-G-H-L). In this example, a set of the first three paths may be identified as the set of paths equally having the least number of hops (3). Such a set of equal cost paths can be used by an edge device in a load balancing process.

Figure 3:
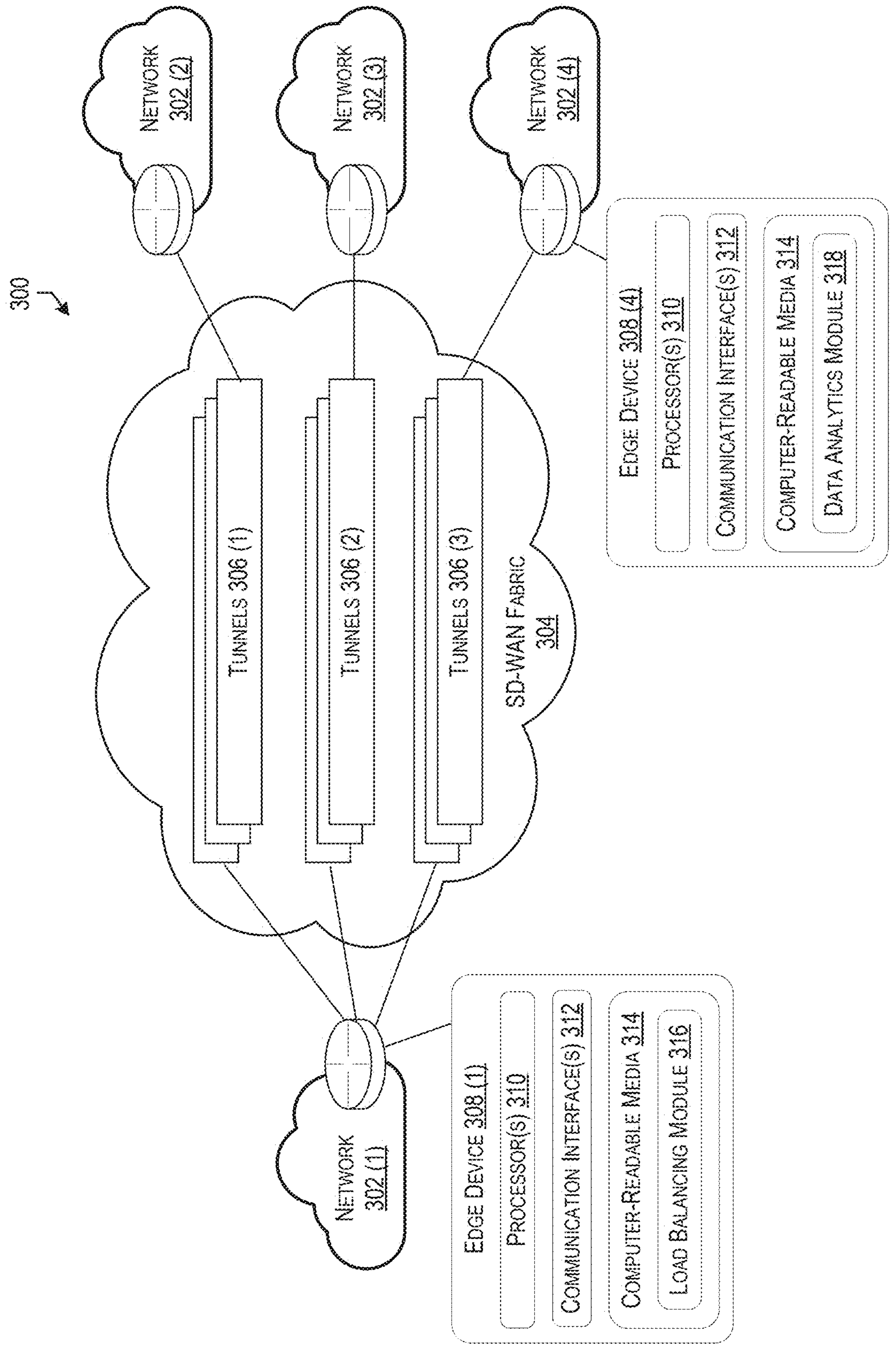
FIG. 3 depicts a component diagram illustrating various components that may be implemented within a network architecture in accordance with at least some embodiments.

FIG. 3 depicts a component diagram illustrating various components that may be implemented within a network architecture in accordance with at least some embodiments. More particularly, FIG. 3 depicts a network architecture 300 that includes a representation of a first network 302 (1) in communication with a number of other networks 302 (2-4) over a SD-WAN fabric 304 via a number of tunnels 306 (1-3). Note that a "tunnel" as discussed herein is a type of path.

In some cases, one or more network 302 may represent a data center fabric. A data center fabric is a system of switches and the interconnections between them that can be represented as a unified logical entity. The fabric allows for a flattened network architecture in which any attached server or storage node can connect to any other server or storage node.

Each network 302 may be accessed by one or more respective edge device 308 that provides ingress/egress to that network. The exemplary edge device 308 may be an example of the edge device 106 as described in relation to FIG. 1 above. It should be noted that such an edge device (or any other described computing component) may include a single computing device (e.g., a server device) or a combination of computing devices. In some cases, the edge device may be implemented as a virtual device/system (e.g., via virtual machines implemented within a cloud computing environment). In the depicted example, network 302 (1) may be a source of network traffic that is received at network 302 (4). In such cases, the edge device 308 (1) may act as a source device whereas the edge device 308 (4) may act as a receiving device.

As illustrated, the edge device 308 may include one or more hardware processors 310 configured to execute one or more stored instructions. Such processors 310 may comprise one or more processing cores. Further, the edge device 308 may include one or more communication interfaces 312 configured to provide communications between the edge device 308 and other devices, such as nodes implemented within a tunnel 306, a client computing device, or any other suitable electronic device.

In embodiments, the processors 310 may represent one or more Data Processing Units (DPUs) that combine a multi-core CPU, a network interface, and one or more acceleration engines. While a DPU can be used as a stand-alone embedded processor, it may also alternatively be incorporated into a SmartNIC (e.g., a network interface controller). In a DPU, the network interface is powerful and flexible enough to handle all network data path processing, while the embedded multi-core CPU is used for control path initialization and exception processing.

The edge device 308 may also include computer-readable media 314 that stores various executable components (e.g., software-based components, firmware-based components, etc.). The computer-readable media 314 may store components to implement functionality described herein. While not illustrated, the computer-readable media 314 may store one or more operating systems utilized to control the operation of the one or more devices that comprise the edge device 308. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 314 may include portions, or components, that configure the edge device 308 to perform various operations described herein. For example, the computer-readable media 314 may include some combination of components configured to implement the described techniques. Particularly, the edge device 308 may include a component configured to (e.g., load balancing module 316) and/or a component configured to (e.g., data analytics module 318). Additionally, the computer-readable media 314 may further maintain one or more databases, such as a database that includes information (e.g., metrics) in relation to a number of paths/tunnels 306.

A load balancing module 316 may be configured to, when executed by the processors 310, determine a set of tunnels 306 (3) associated with a network 302 (4) upon receiving a data packet directed toward that network. In such cases, the set of tunnels 306 (4) may represent a portion of the total number of tunnels that can be traversed between the edge device 308 (1) of a source network and an edge device 308 (4) of a receiving network. More particularly, the set of tunnels 306 may represent a set of tunnels (3) that equally have the lowest cost (e.g., measured in number of hops) of the total number of tunnels.

Upon determining a set of tunnels 306 (3) directed toward the network 302 (4), the load balancing module 316 may be configured to identify one or more SLA requirements associated with the data packet in order to further identify a subset of the set of tunnels (3) that are capable of meeting those SLA requirements. The subset of the set of tunnels (3) may be identified by the load balancing module 316 based on information (e.g., metrics) stored in relation to the respective tunnels/paths of the set of tunnels 306. For example, where the SLA requirements associated with a data packet (which may be associated with it by virtue of a client device from which the data packet originated) may include an indication of a minimum threshold value for one or more metric. In this example, a tunnel may be identified for the subset of tunnels if the respective metrics for that tunnel meet the indicated minimum threshold value.

Once the load balancing module 316 has identified a subset of the tunnels 306 (3) over which the data packet can be sent to network 302 (4), it may be configured to perform a load balancing technique in order to identify a selected tunnel/path from the subset of the set of tunnels 306 (3). In embodiments, this may involve performing a hash (or other suitable distribution) algorithm to identify the tunnel (e.g., as a "bucket"). Such a hash algorithm may be performed using a unique identifier associated with the data packet. Typically, a hash algorithm is used to generate a pseudorandom number based on information about the object (e.g., data packet) to be hashed. That pseudo-random number is then used to assign the object to a bucket (e.g., a tunnel/path).

Once the load balancing module 316 has identified a tunnel to be used to transmit the data packet (e.g., using the hash algorithm) to its destination, the load balancing module 316 may be configured to generate metadata to be appended to the data packet. Such metadata may include at least an indication of the identified tunnel as well as a timestamp at which the data packet is to be transmitted (e.g., a current timestamp). The metadata may then be appended to the data packet (e.g., in a header of the data packet). In some cases, the data packet may then be cryptographically secured (e.g., encrypted) before being transmitted over the identified tunnel by either the load balancing module 316 or another component of the edge device 308 (1). The edge device 308 (1) may transmit the data packet that includes the metadata over the tunnel (e.g., by being provided to a network node identified as the first hop in the identified tunnel).

A data analytics module 318 may be configured to, when executed by the processors 310, determine one or more metric values for one or more tunnels over which network traffic (e.g., data packets) is received. In embodiments, the data analytics module 318 may retrieve metadata that is appended to each of the data packets that it receives. In some cases, the data analytics module 318 (or another component of the edge device 308 (4)) may first decrypt a received data packet. The data analytics module 318 may retrieve from that metadata at least an indication of the tunnel over which the data packet was received as well as a timestamp corresponding to a time at which the data packet was transmitted. The data analytics module 318 may then determine one or more metric values to be associated with the tunnel indicated in the metadata. For example, the data analytics module 318 may determine a transit time for the data packet based on a difference between a time at which the data packet was received and a time indicated in the timestamp of the metadata. The data analytics module 318 may then be configured to generate various metric values associated with the identified tunnel that is then stored as path data. In some cases, the metric values generated for a tunnel in relation to multiple received data packets may be aggregated in order to provide more holistic metric values. In some cases, the path data may be provided to one or more trained machine learning models in order to generate minimum/maximum metric data values.

The edge device 308 (4) may be configured to forward the received data packet to its intended recipient once the data analytics module 318 has extracted the relevant metadata from that data packet. The edge device 308 (4) may be further configured to provide path data back to the edge device 308 (1). In some cases, this may involve the edge device 308 (4) sending a notification to one or more other edge devices (e.g., via a control message between edge devices (IPSEC peers)) at periodic intervals. In other cases, the edge device 308 (4) may provide a notification back to the edge device 308 (1) in response to the receiving of the data packet and the generation of the path data. It should be noted that the notification may be sent in a separate communication, or it may be folded into a data flow (e.g., by being appended as metadata to a data packet being transmitted between the two edge devices).

It should be noted that while the load balancing module 316 and the data analytics module 318 are depicted as being included in separate edge devices 308, both modules may be implemented within a single edge device 308 that both receives and directs network traffic.

Figure 4:
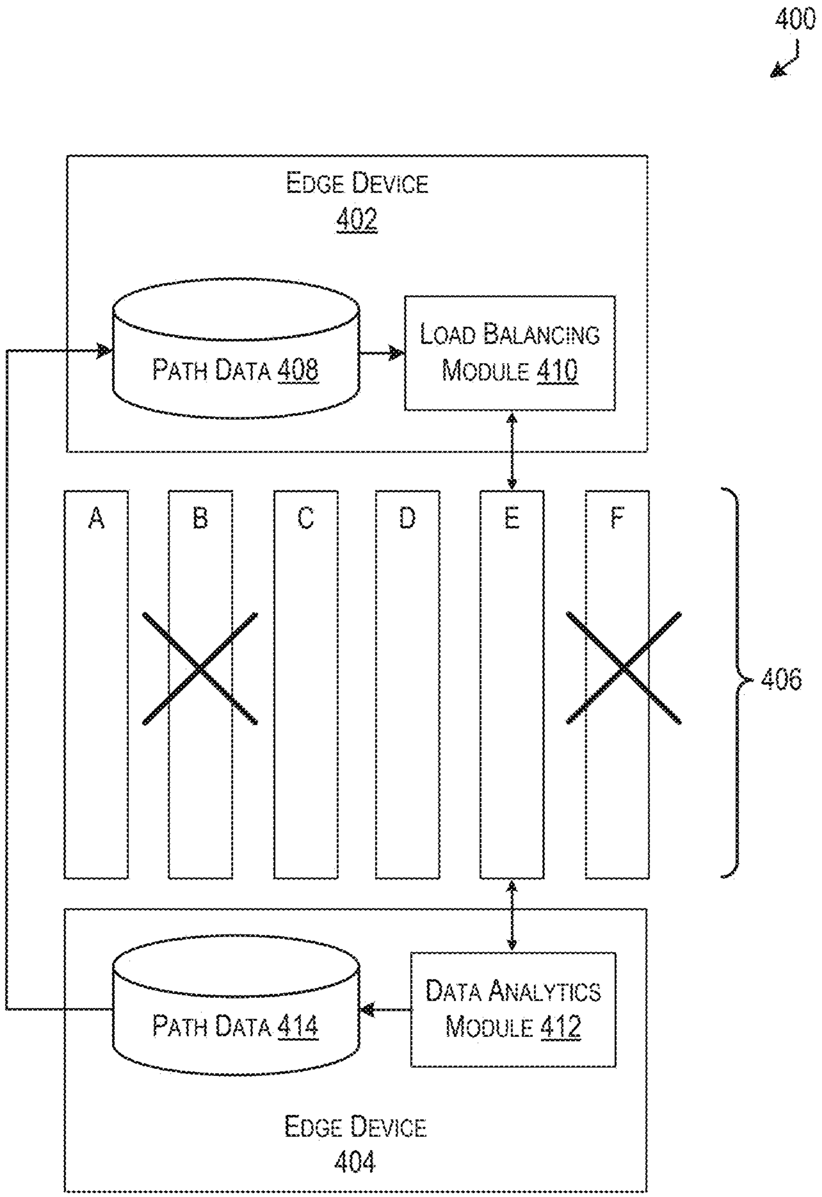
FIG. 4 depicts a block diagram illustrating a process for performing improved load balancing in accordance with at least some embodiments.

FIG. 4 depicts a block diagram illustrating a process for performing improved load balancing in accordance with at least some embodiments. In the process 400, a first edge device 402 may transmit one or more data packets to a second edge device 404 over a set of paths 406.

Initially, the edge device 402 may identify a set of paths 406 between the edge device 402 and the edge device 404 as including paths A-F, each of which may be implemented within a network (e.g., SD-WAN fabric 304). Note that additional paths may exist, but may have higher costs than the paths A-F, and so may not be identified or included in the set of paths 406. Information about each of the paths A-F in the set of paths 406 may be stored by the edge device 402 in path data 408.

As noted elsewhere, when network traffic (e.g., a sequence of data packets) is received at the edge device 402 to be transmitted to the edge device 404, a load balancing module 410 may be configured to determine a subset of the set of paths 406. The load balancing module 410 may be an example of the load balancing module 316 as described above in relation to FIG. 3. The load balancing module 410 may first retrieve information about SLA requirements for the network traffic. Such SLA requirements may be associated with the network traffic by virtue of being associated with a client or client device that originated the network traffic.

Based on the retrieved SLA requirements, the load balancing module 410 may determine which of the paths A-F in the set of paths 406 meet those SLA requirements. For example, the load balancing module 410 may determine if various metrics associated with each respective path meet minimum threshold requirements as indicated in the retrieved SLA requirements. The load balancing module 410 may then generate a subset of the set of paths 406 that include those paths that meet the SLA requirements. For example, in the depicted example, paths B and F may be eliminated by virtue of not meeting the SLA requirements. Hence, the subset of the set of paths 406 may initially include paths A, C, D, and E. It should be noted that the subset of paths may be redetermined dynamically (e.g., as new path data 408 is received) such that the paths included in that subset may vary over time.

Once a subset of paths has been generated, the load balancing module 410 may transmit the data packets of the network traffic over that subset of paths. As noted elsewhere, the load balancing module 410 may use a load balancing algorithm to distribute data packets across the different paths in the subset of paths. It should be noted that the use of such a load balancing algorithm may result in a roughly equal distribution of data packets across the subset of paths.

Each time that the load balancing module 410 is set to transmit a data packet across one of the paths (A, C, D, or E) in the subset of paths, it may first generate and append metadata to that data packet (e.g., to a header of the data packet). As noted elsewhere, such metadata may include an indication of a time at which the data packet is being transmitted (e.g., a current timestamp) and an indication of a path (e.g., tunnel) over which the data packet will be transmitted. In some cases, the data packet (including the appended metadata) may be encrypted in order to prevent access to information in that data packet by nodes included in the selected path. In such cases, the encryption used to cryptographically secure the data packet may allow for decryption by edge devices that each have stored a cryptographic key.

Upon receiving the data packets for the network traffic over the subset of paths, the data analytics module 412 may be configured to retrieve metadata attached to each of the data packets in order to generate path data 414. Note that the data analytics module 412 may be an example of the data analytics module 318 described in relation to FIG. 3 above. As noted elsewhere, the data analytics module 412 may be configured to calculate values for one or more metrics (e.g., KPIs) based on the metadata extracted from the data packet. Such values may be stored in path data 414 in relation to the particular path over which the data packet was received. Notably, the edge device 404 may receive multiple data packets of the network traffic over each of the paths in the subset of paths. In such cases, the data analytics module 412 may be configured to aggregate values for each metric stored in the path data 414 based on the values calculated in relation to each of the multiple data packets received over a particular path. In some cases, this may involve calculating an average or mean from the multiple values to be stored in the path data 414. In some cases, this may involve identifying a maximum and/or minimum value from the multiple values to be stored in the path data 414.

In some embodiments, the path data 414 may be configured to allow for metric values to be stored with respect to date/time. For example, the path data may aggregate metric values collected in relation to a particular path within predetermined time intervals. This allows the path to be assessed with respect to a particular time interval. For example, in order to determine whether SLA requirements associated with a data packet can be achieved in relation to a particular path, the path data may be segregated into metric values aggregated during 10-minute intervals. In such cases, the path may be assessed for a particular time interval within which that data packet is to be sent. For example, the path data 414 may include an indication of an average or a maximum/minimum value for one or more metrics over each particular time interval as determined based on metadata obtained from various a number of data packets received during such time intervals historically. In some cases, information obtained from metadata of one or more data packets may be provided to a machine learning model that has been trained to generate path data.

The edge device 404 may provide information included in the path data 414 to other edge devices, including edge device 402. In some cases, this may involve sending (e.g., broadcasting) the information to multiple edge devices in a single communication. In such cases, the information may be sent at fixed (e.g., periodic) intervals. In some cases, the edge device 404 may provide information from path data 414 to the edge device 402 via a response to receiving the data packet. For example, upon receiving the data packet, the edge device 404 may retrieve the metadata from the data packet, forward the data packet to its intended destination, generate aggregated path data for the selected path (e.g., over which the data packet was received), generate a response that includes that information, and transmit the response back to the edge device 402 (over the same or a different path).

In embodiments, at least a portion of the path data 414 may be provided back to the edge device 402 to be used to update path data 408. In embodiments, the path data 408 may include information about paths available to the edge device 402. For example, upon receiving the portion of the path data 414 from the edge device 404, the information about paths A-F may be updated based on that information. Once the path data 408 has been updated in this manner, the load balancing module 410 may use that updated path data 408 to make future data packet routing decisions.

Figure 5:
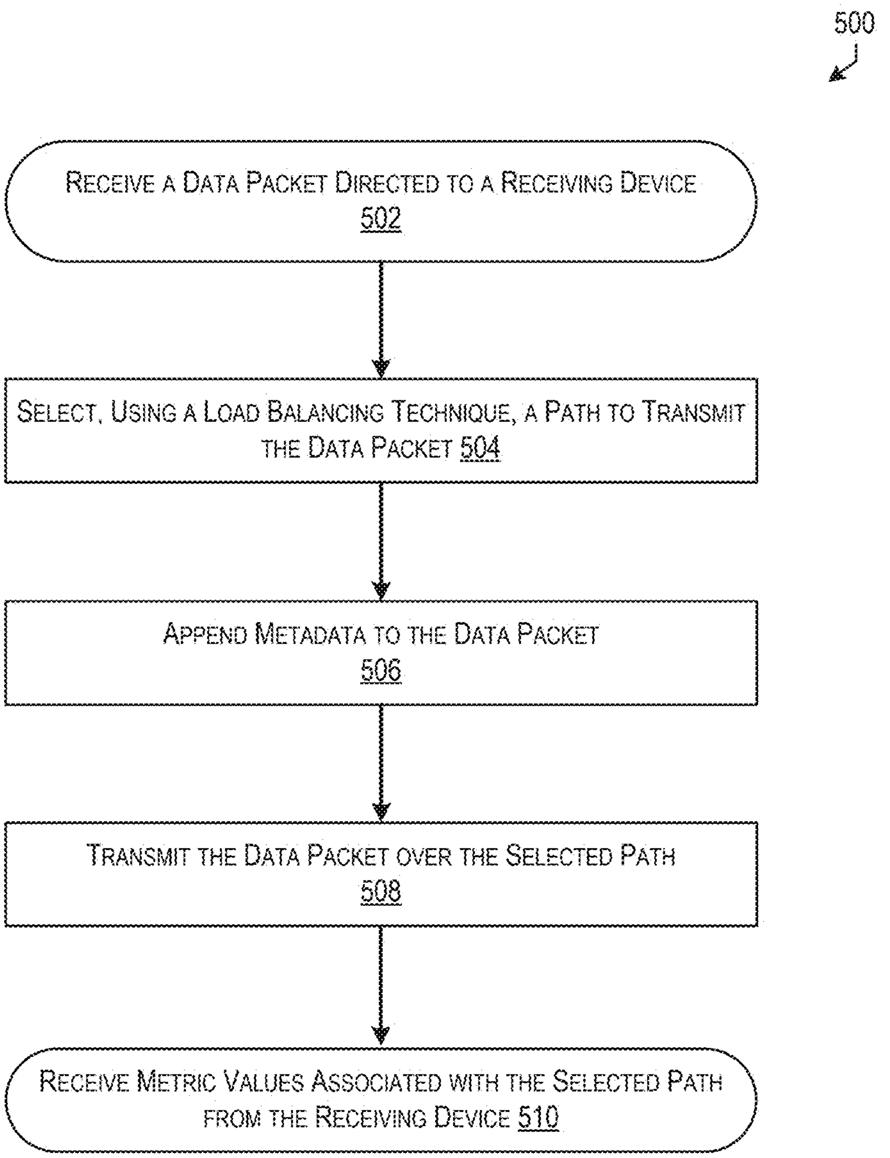
FIG. 5 depicts a flow diagram illustrating an exemplary process for optimizing path selection for load balancing operations in accordance with at least some embodiments

FIG. 5 depicts a flow diagram illustrating an exemplary process for optimizing path selection for load balancing operations in accordance with at least some embodiments. In embodiments, the process 500 may be performed with respect to one or more devices capable of routing communications over a network, such as an edge device (e.g., edge device 106 of FIG. 1).

At 502, the process 500 may involve receiving a data packet to be transmitted to a receiving device. In embodiments, the data packet is one of multiple data packets making up network traffic. The data packet may be determined to be directed to the receiving edge device based on information included in the data packet (e.g., within a header of the data packet).

At 504, the process 500 may involve selecting, using one or more load balancing technique, a path over which to transmit the data packet. The path is selected from a set of paths that are determined to be suitable for transmission of the data packet. The set of paths may be determined based on path data stored by the source edge device that includes one or more metric values associated with individual paths in the set of paths. In embodiments, the set of paths may be determined based on one or more service level agreement (SLA) requirements associated with the data packet. In those embodiments, the SLA requirements may be determined based on a client device from which the data packet originated.

At 506, the process 500 may involve generating and appending metadata to the data packet. In embodiments, the metadata may include at least a timestamp representing a time at which the data packet is to be transmitted to the receiving edge device. In embodiments, the metadata may further include an indication of the path over which the data packet is to be sent.

At 508, the process 500 may involve transmitting the data packet over the selected path. In some cases, the selected path may be an IPSEC tunnel within a network fabric, such as a SD-WAN fabric.

At 510, the process 500 may involve receiving metric values associated with the selected path from the receiving device. In embodiments, the metric values associated with the selected path may be received via a response to transmitting the data packet. In embodiments, the metric values associated with the selected path may be received via a broadcast message from the receiving device (e.g., as transmitted to multiple edge devices). It should be noted that the metric data may be relayed back to the source edge device in a separate message or as folded into regular network traffic. For example, rather than relay various metric data between edge devices in a peer to peer message, the edge device that compiled the metric data may include that metric data into a data packet that is directed to the source edge device. In such a scenario, the metric data may be included in a payload of the data packet or it may be attached as metadata (e.g., to a header) for the data packet. In some cases, such metric data may include at least one of a loss, latency, delay, jitter, or throughput calculated with respect to the selected path. In some cases, the metric value data may include metric values aggregated from metadata retrieved from multiple data packets. In some cases, the metric value data may be generated using a trained machine learning model.

In some embodiments, the process 500 may further involve updating the path data based on the received information about the selected path. The edge device may further update the paths that are included in the set of paths based on the updated path data. The updated set of paths may include different paths than were included in the original set of paths. When the edge device receives a second data packet with the same service level agreement requirements that is directed to the same receiving edge device, it may perform load balancing using the second set of paths.

Figure 6:
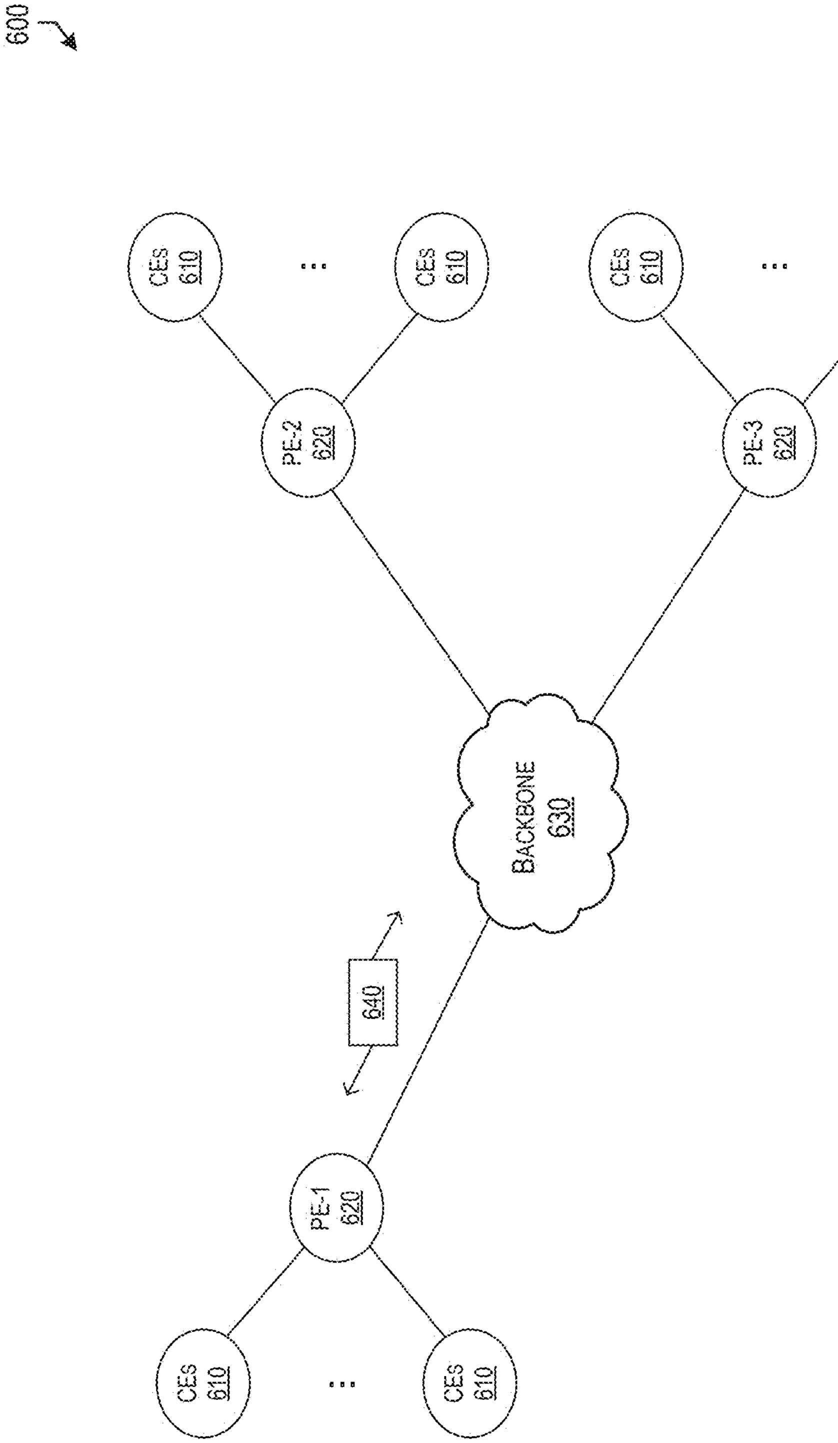
FIG. 6 is a schematic block diagram of an example computer network.

FIG. 6 is a schematic block diagram of an example computer network 600 illustratively comprising nodes/devices, such as a plurality of routers/devices interconnected by links or networks, as shown. A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANS). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In the depicted example, customer edge (CE) routers 610 may be interconnected with provider edge (PE) routers 620 (e.g., PE-1, PE-2, and PE-3) in order to communicate across a core network, such as an illustrative network as backbone 630. For example, routers 610, 620 may be interconnected by the public Internet, a multiprotocol label switching (MPLS) virtual private network (VPN), or the like. Data packets 640 (e.g., traffic/messages) may be exchanged among the nodes/devices of the computer network 600 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 610 shown in network 600 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 600 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2, or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 610 connected to PE-2 and a second CE router 610 connected to PE-3.

Figure 7:
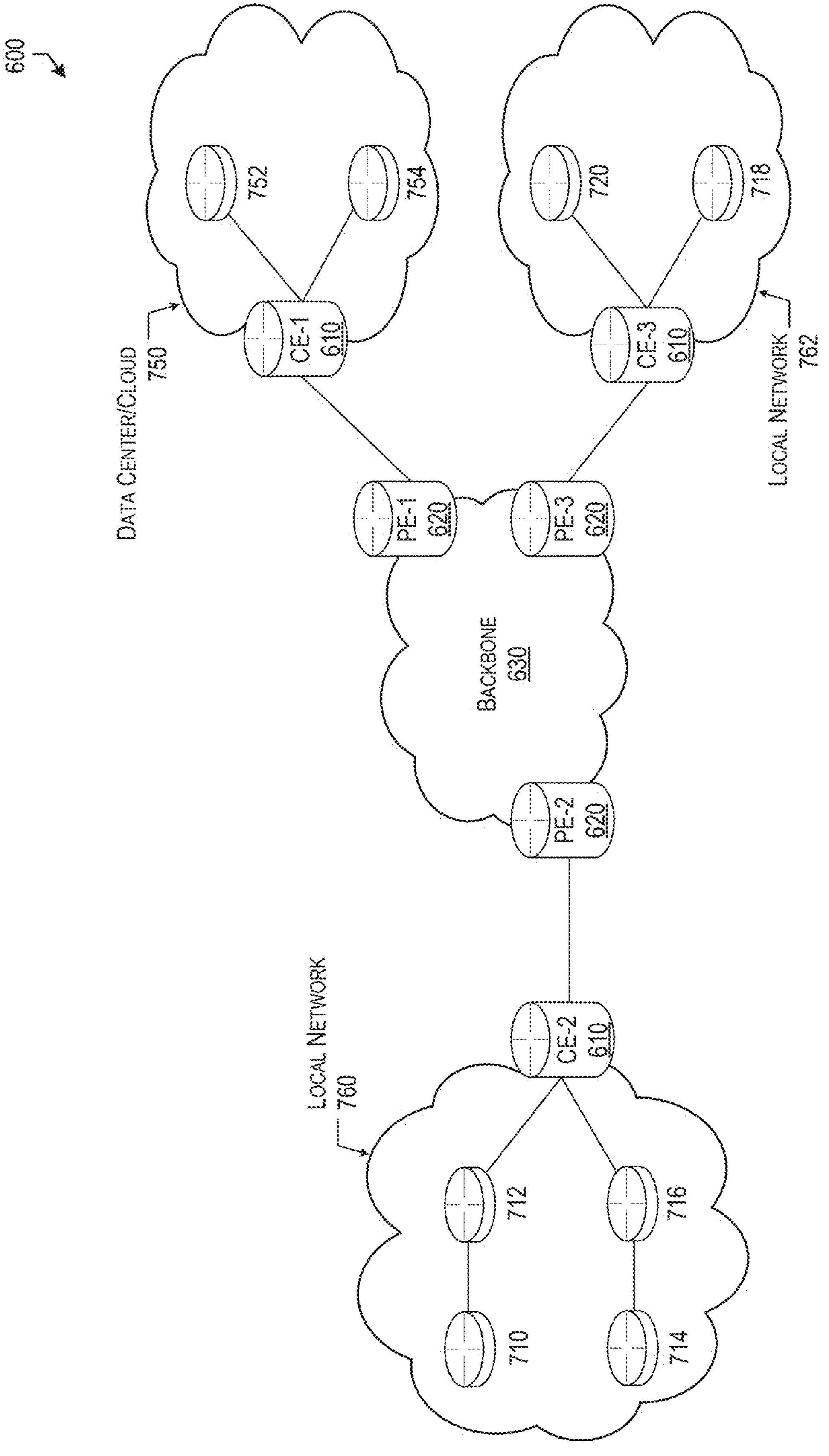
FIG. 7 illustrates an example of a computer network in greater detail, according to various embodiments.

FIG. 7 illustrates an example of network 600 in greater detail, according to various embodiments. As shown, network backbone 630 may provide connectivity between devices located in different geographical areas and/or different types of local networks. For example, network 600 may comprise local/branch networks 760, 762 that include devices/nodes 710-716 and devices/nodes 718-720, respectively, as well as a data center/cloud 750 that includes servers 752-754. Notably, local networks 760-762 and data center/cloud 750 may be located in different geographic locations.

Servers 752-754 may include, in various embodiments, a network management server (NMS), a dynamic host configuration protocol (DHCP) server, a constrained application protocol (COAP) server, an outage management system (OMS), an application policy infrastructure controller (APIC), an application server, etc. As would be appreciated, network 600 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software defined WAN (SD-WAN) may be used in network 600 to connect local network 760, local network 762, and data center/cloud 750. In general, an SD-WAN uses a software defined networking (SDN)-based approach to instantiate tunnels on top of the physical network and control routing decisions, accordingly. For example, as noted above, one tunnel may connect router CE-2 at the edge of local network 760 to router CE-1 at the edge of data center/cloud 750 over an MPLS or Internet-based service provider network in backbone 630. Similarly, a second tunnel may also connect these routers over a 4G/5G/LTE cellular service provider network. SD-WAN techniques allow the WAN functions to be virtualized, essentially forming a virtual connection between local network 760 and data center/cloud 750 on top of the various underlying connections. Another feature of SD-WAN is centralized management by a supervisory service that can monitor and adjust the various connections, as needed.

Figure 8:
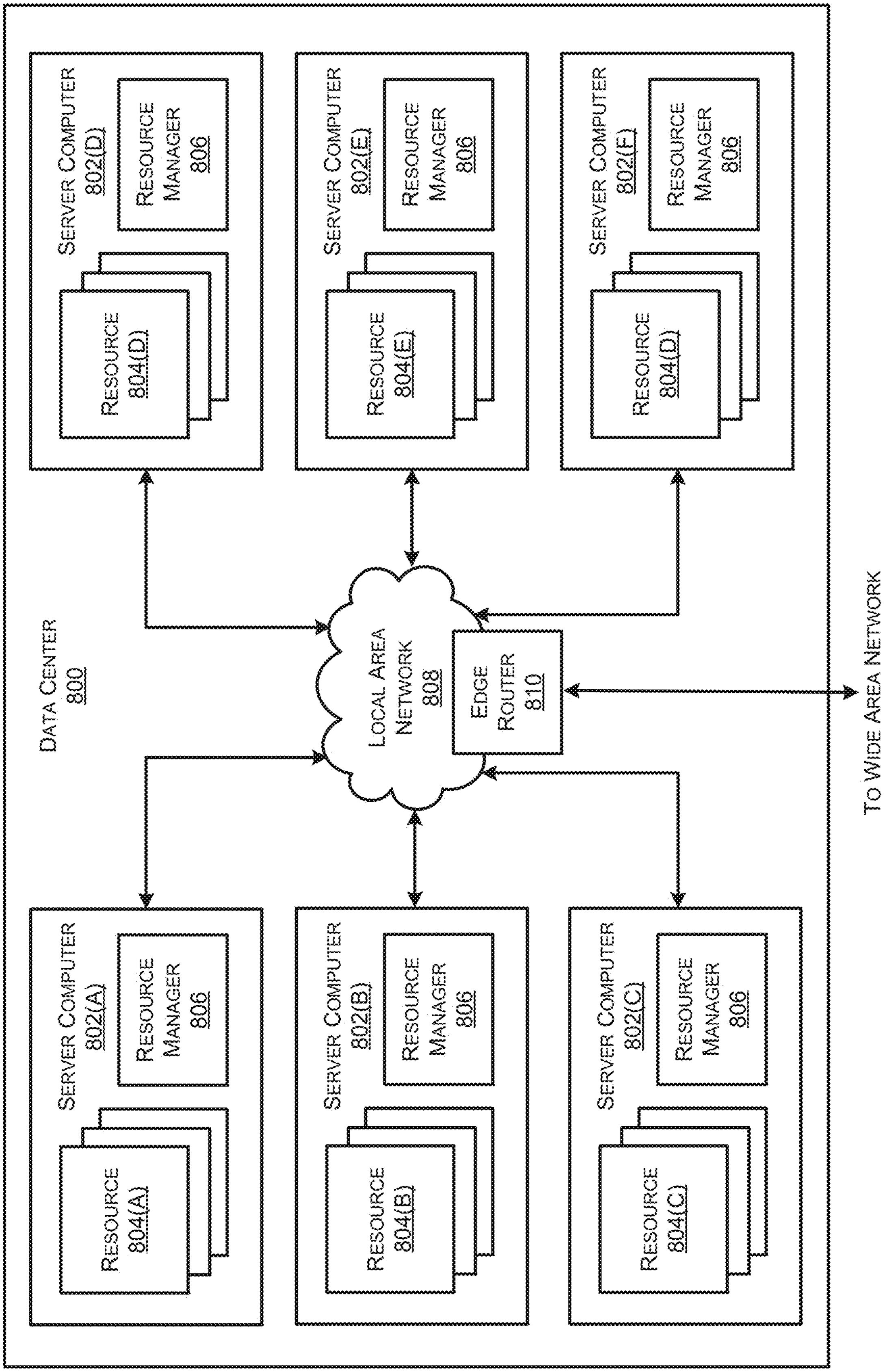
FIG. 8 is a computing system diagram illustrating a configuration for a data center 800 that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, and others. Some of the server computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In some examples, the server computers 802 may each execute one or more application containers and/or virtual machines to perform techniques described herein.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

The LAN 808 may be configured to enable connectivity between the server computers 802(A-F) and an external wide area network (WAN). In some embodiments, this is accomplished via an edge router 810 in communication with the LAN 808. Such an edge router 810 may use any suitable routing protocols to route communications between the various components depicted.

Figure 9:
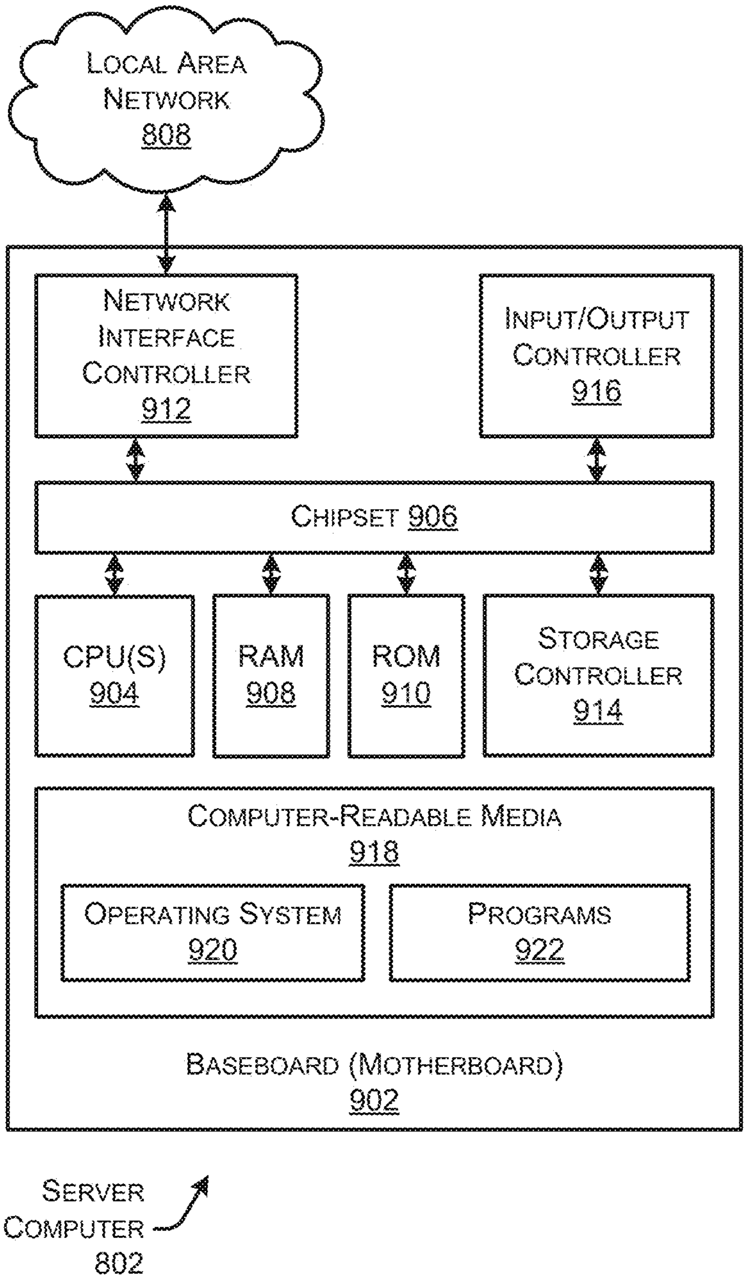
FIG. 9 shows an example computer architecture for a server computer capable of executing program components for implementing the functionality described above.

FIG. 9 shows an example computer architecture for a server computer 802 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The server computer 802 may, in some examples, correspond to a physical server as described herein, and may comprise networked devices such as servers, switches, routers, hubs, bridges, gateways, modems, repeaters, access points, etc.

The server computer 802 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the server computer 802.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the server computer 802. The chipset 906 can further provide an interface to a computer-readable storage medium such as a read-only memory ("ROM") 910 or non-volatile RAM ("NVRAM") for storing basic routines that help to startup the server computer 802 and to transfer information between the various components and devices. The ROM 910 or NVRAM can also store other software components necessary for the operation of the server computer 802 in accordance with the configurations described herein.

The server computer 802 can operate in a networked environment using logical connections to remote computing devices and computer systems through a network, such as the LAN 808. The chipset 906 can include functionality for providing network connectivity through a NIC 912, such as a gigabit Ethernet adapter. The NIC 912 is capable of connecting the server computer 802 to other computing devices over the LAN 808 (and/or 102). It should be appreciated that multiple NICs 812 can be present in the server computer 802, connecting the computer to other types of networks and remote computer systems.

The server computer 802 can be connected to a storage device 918 that provides non-volatile storage for the computer. The storage device 918 can store an operating system 920, programs 922, and data, which have been described in greater detail herein. The storage device 918 can be connected to the server computer 802 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 802 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the server computer 802 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 802 can further read information from the storage device 918 by detecting the physical states or characteristics of one or more particular locations within the physical storage units.

In addition to the mass storage device 918 described above, the server computer 802 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 802. In some examples, the operations performed by devices as described herein may be supported by one or more devices similar to server computer 802. Stated otherwise, some or all of the operations performed by the edge device 106, and/or any components included therein, may be performed by one or more server computer 802 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("IHD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the server computer 802. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the server computer 802.

In one embodiment, the storage device 918 or other computer-readable storage media is encoded with computer-executable instructions which, when loaded into the server computer 802, transform the computer from a general-purpose computing system into a special-purpose computer capable of implementing the embodiments described herein. These computer-executable instructions transform the server computer 802 by specifying how the CPUs 904 transition between states, as described above. According to one embodiment, the server computer 802 has access to computer-readable storage media storing computer-executable instructions which, when executed by the server computer 802, perform the various processes described above with regard to FIGS. 1-5. The server computer 802 can also include computer-readable storage media having instructions stored thereupon for performing any of the other computer-implemented operations described herein.

The server computer 802 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the server computer 802 might not include all of the components shown in FIG. 9, can include other components that are not explicitly shown in FIG. 6, or might utilize an architecture completely different than that shown in FIG. 9.

As described herein, the server computer 802 may include one or more hardware processors (e.g., CPU 904) configured to execute one or more stored instructions. The processors may comprise one or more cores. Further, the server computer 802 may include one or more network interfaces configured to provide communications between the computer 802 and other devices, such as the communications described herein as being performed by the edge device 106. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 600. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 922 may comprise any type of programs or processes to perform the techniques described in this disclosure. The programs 922 may comprise any type of program that cause the server computer 802 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause server computer 802 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfied, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a source edge device, a data packet to be transmitted to a receiving edge device;

selecting, by the source edge device using one or more load balancing technique, a path from a set of paths to be used to transmit the data packet;

appending, by the source edge device to the data packet, metadata including an indication of the selected path and a timestamp representing a current time at which the data packet is to be transmitted, wherein the metadata is and appended timestamp are encrypted;

transmitting, by the source edge device, the data packet including the encrypted metadata to the receiving edge device over the selected path, wherein the receiving edge device is caused to decrypt the metadata and extract the timestamp from the metadata, determine a transit time for the data packet based on a difference between a time at which the data packet was received and the time indicated in the timestamp, and generate information about the selected path based on the transit time; and receiving, by the source edge device from the receiving edge device, the information about the selected path; and updating, by the source edge device, path data stored in local memory based on the received information, wherein the path data is used to determine a subset of the set of paths for subsequent load balancing operations.

2. The method of claim 1, wherein the set of paths is determined based on path data stored by the source edge device.

3. The method of claim 2, wherein the path data comprises one or more metric values associated with individual paths in the set of paths.

4. The method of claim 2, further comprising updating the path data based on the received information about the selected path.

5. The method of claim 4, further comprising updating the set of paths based on the updated path data.

6. The method of claim 1, wherein the set of paths is determined based on one or more service level agreement (SLA) requirements associated with the data packet.

7. The method of claim 6, wherein the SLA requirements are determined based on a client device from which the data packet originated.

8. A source edge device, comprising:

one or more processors; and one or more non-transitory computer-readable media storing computer-executable instructions that, when executed by the one or more processors, cause the source edge device to perform operations comprising:

receiving a data packet directed to a receiving edge device;

selecting, using one or more load balancing technique, a path from a set of paths to be used to transmit the data packet;

appending, to the data packet, metadata including an indication of the selected path and a timestamp representing a current time at which the data packet is to be transmitted, wherein the metadata is and appended timestamp are encrypted;

transmitting the data packet including the encrypted metadata to the receiving edge device over the selected path, wherein the receiving edge device is caused to decrypt the metadata and extract the timestamp from the metadata, determine a transit time for the data packet based on a difference between a time at which the data packet was received and the time indicated in the timestamp, and generate information about the selected path based on the transit time metadata; and receiving, from the receiving edge device, the information about the selected path; and updating path data stored in local memory based on the received information, wherein the path data is used to determine a subset of the set of paths for subsequent load balancing operations.

9. The source edge device of claim 8, wherein the operations further comprise:
- updating path data stored by the edge device based on the information about the selected path;
- selecting a second set of paths based on the updated path data;
- receiving a second data packet directed to the receiving edge device; and
- selecting a second path from the second set of paths to be used to transmit the data packet.

10. The source edge device of claim 9, wherein the second set of paths includes different paths from the set of paths.

11. The source edge device of claim 8, wherein the information about the selected path is received via a response to transmitting the data packet.

12. The source edge device of claim 8, wherein the information about the selected path is received via a broadcast message from the receiving device.

13. The source edge device of claim 8, wherein the information about the selected path comprises at least one of a loss, latency, delay, jitter, or throughput calculated with respect to the selected path.

14. The source edge device of claim 8, wherein the information about the selected path comprises one or more metric values aggregated from metadata retrieved from multiple data packets.

15. The source edge device of claim 8, wherein the information about the selected path is generated using a trained machine learning model.

16. The source edge device of claim 8, wherein at least one path in the set of paths comprises an IPSEC tunnel within a network fabric.

17. A receiving edge device, comprising:
- one or more processors; and
- one or more non-transitory computer-readable media storing computer-executable instructions that, when executed by the one or more processors, cause the receiving edge device to perform operations comprising:
  - receiving a data packet from a source edge device over a path, wherein the data packet includes encrypted metadata appended by the source edge device, the encrypted metadata including an indication of the path and a timestamp representing a time at which the data packet was transmitted by the source edge device;
  - decrypting the encrypted metadata;
  - retrieving at least the timedata stamp from the decrypted metadata included in the data packet;
  - determining a transit time for the data packet based on a difference between a time at which the data packet was received and the time indicated in the timestamp;
  - determining one or more metric values associated with the path based at least in part on the transit time data;
  - generating aggregated data based on the one or more metric values determined from a plurality of data packets received over the path; and
  - providing the aggregated data to at least one second edge device, wherein the aggregated data is usable by the at least one second edge device to update path data for subsequent path selection operations.

18. The receiving edge device of claim 17, wherein the aggregated data is generated based on information retrieved from multiple data packets received over the path.

19. The receiving edge device of claim 17, wherein the aggregated data is segregated based on time intervals.

* * * * *